(12) United States Patent
Mahurin et al.

(10) Patent No.: US 11,372,804 B2
(45) Date of Patent: Jun. 28, 2022

(54) SYSTEM AND METHOD OF LOADING AND REPLICATION OF SUB-VECTOR VALUES

(71) Applicant: QUALCOMM Incorporated, San Diego, CA (US)

(72) Inventors: Eric Mahurin, Austin, TX (US); Erich Plondke, Austin, TX (US); David Hoyle, Austin, TX (US)

(73) Assignee: Qualcomm Incorporated, San Diego, CA (US)

( * ) Notice: Subject to any disclaimer, the term of this patent is extended or adjusted under 35 U.S.C. 154(b) by 108 days.

(21) Appl. No.: 15/981,203

(22) Filed: May 16, 2018

(65) Prior Publication Data

US 2019/0354508 A1 Nov. 21, 2019

(51) Int. Cl.
| | | |
|---|---|---|
| G06F 15/00 | (2006.01) | |
| G06F 15/76 | (2006.01) | |
| G06F 15/80 | (2006.01) | |
| G06F 9/30 | (2018.01) | |

(52) U.S. Cl.
CPC ...... *G06F 15/8076* (2013.01); *G06F 9/30036* (2013.01); *G06F 15/8092* (2013.01)

(58) Field of Classification Search
CPC ............. G06F 15/8076; G06F 9/30036; G06F 15/8092
USPC .......................................................... 712/4
See application file for complete search history.

(56) References Cited

U.S. PATENT DOCUMENTS

| | | | |
|---|---|---|---|
| 7,552,316 B2 | 6/2009 | Hussain | |
| 7,873,812 B1* | 1/2011 | Mimar | G06F 9/3887 |
| | | | 712/22 |
| 8,108,652 B1* | 1/2012 | Hui | G06F 9/3012 |
| | | | 712/4 |
| 8,161,266 B2 | 4/2012 | Colavin | |
| 9,588,746 B2* | 3/2017 | Gschwind | G06F 9/30145 |
| 9,600,281 B2 | 3/2017 | Eichenberger et al. | |
| 9,626,168 B2 | 4/2017 | Gschwind et al. | |
| 9,733,913 B2 | 8/2017 | Bharadwaj et al. | |
| 10,261,789 B2* | 4/2019 | Reid | G06F 9/30043 |
| 2005/0193050 A1 | 9/2005 | Sazegari | |
| 2009/0307656 A1* | 12/2009 | Eichenberger | G06F 8/45 |
| | | | 717/110 |
| 2011/0040822 A1 | 2/2011 | Eichenberger et al. | |
| 2012/0011348 A1* | 1/2012 | Eichenberger | G06F 9/30032 |
| | | | 712/222 |
| 2013/0339664 A1 | 12/2013 | Ould-Ahmed-Vall et al. | |

OTHER PUBLICATIONS

International Search Report and Written Opinion—PCT/US2019/031129—ISA/EPO—dated Jul. 24, 2019.

* cited by examiner

*Primary Examiner* — Chun Kuan Lee
(74) *Attorney, Agent, or Firm* — Moore IP

(57) ABSTRACT

A processor includes a vector register configured to load data responsive to a special purpose load instruction. The processor also includes circuitry configured to replicate a selected sub-vector value from the vector register.

23 Claims, 4 Drawing Sheets

SYSTEM AND METHOD OF LOADING AND REPLICATION OF SUB-VECTOR VALUES

I. FIELD

The present disclosure is generally related to processors, and more specifically related to loading and replication of data for vector processing.

II. DESCRIPTION OF RELATED ART

Advances in technology have resulted in more powerful computing devices. For example, computing devices such as laptop and desktop computers and servers, as well as wireless computing devices such as portable wireless telephones, have improved computing capabilities and are able to perform increasingly complex operations. Increased computing capabilities have also enhanced device capabilities in various other applications. For example, vehicles may include processing devices to enable global positioning system operations or other location operations, self-driving operations, interactive communication and entertainment operations, etc. Other examples include household appliances, security cameras, metering equipment, etc., that also incorporate computing devices to enable enhanced functionality, such as communication between internet-of-things (IoT) devices.

A computing device may include one or more digital signal processors (DSPs), image processors, or other processing devices that perform vector processing includes performing multiple instances of a common operation (e.g., a multiply operation) to process multiple elements of vector data in parallel. For example, a vector may include multiple sub-vector values (e.g., individual elements within the vector), such as 32 four-byte values. In an illustrative multiply operation, for each four-byte value of the vector, the first byte is multiplied by a first one-byte value, the second byte is multiplied by a second one-byte value, the third byte is multiplied by a third one-byte value, and the fourth byte is multiplied by a fourth one-byte value. The four multiplication products are added together and the resulting sum is added to a corresponding four-byte value in a destination vector register.

To enable all of the resulting 128 multiplications to be performed simultaneously, each of the four one-byte values are read from a scalar register and are replicated (e.g., multiple copies of the four one-byte values are output at substantially the same time, also referred to herein as "splat" or "broadcast") from the scalar register to inputs of vector multiplication circuitry. However, loading the four one-byte values into the scalar register can cause a processing bottleneck due to the scalar register being loaded via conventional processor operations that involve multiple transfers of the data (e.g., loading the four-byte value from memory to a second-level (L2) cache, from the L2 cache to a first-level (L1) cache, and from the L1 cache to a scalar register in a register file).

III. SUMMARY

In a particular aspect, a processor includes a vector register configured to load data responsive to a special purpose load instruction. The processor also includes circuitry configured to replicate a selected sub-vector value from the vector register.

In another aspect, a method of operating a processor includes loading a vector register responsive to a special purpose load instruction and replicating a selected sub-vector value from the vector register.

In another aspect, an apparatus includes means for storing data loaded responsive to a special purpose load instruction. The apparatus also includes means for replicating a selected sub-vector value from the means for storing data.

One particular advantage provided by at least one of the disclosed aspects is increased processor throughput when performing vector operations by loading the vector register using the special purpose load instruction and replicating a sub-vector value from the vector register, as compared to a processor that loads a value into a scalar register of a general register file and replicates the value from the scalar register. For example, loading a value from an L2 cache into the general register file may include multiple transfers of the data (e.g., from the L2 cache to an L1 cache, and from the L1 cache to the scalar register) that result in longer delay and reduced throughput as compared to loading the value from the L2 cache into the vector register using a single transfer. In addition, or alternatively, processor throughput may be increased by loading multiple values for replication into the vector register using a single load instruction, as compared to performing a separate load operation to load each value for replication into the scalar register of the register file. Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Particular aspects of the present disclosure are described below with reference to the drawings. In the description, common features are designated by common reference numbers. Further, it is to be appreciated that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to another element, but rather distinguishes the element from another element having a same name (but for use of the ordinal term). In addition, as used herein, indefinite articles ("a" and "an") may indicate "one or more" rather than "one." Further, an operation performed "based on" a condition or event may also be performed based on one or more other conditions or events not explicitly recited.

Figure 1:
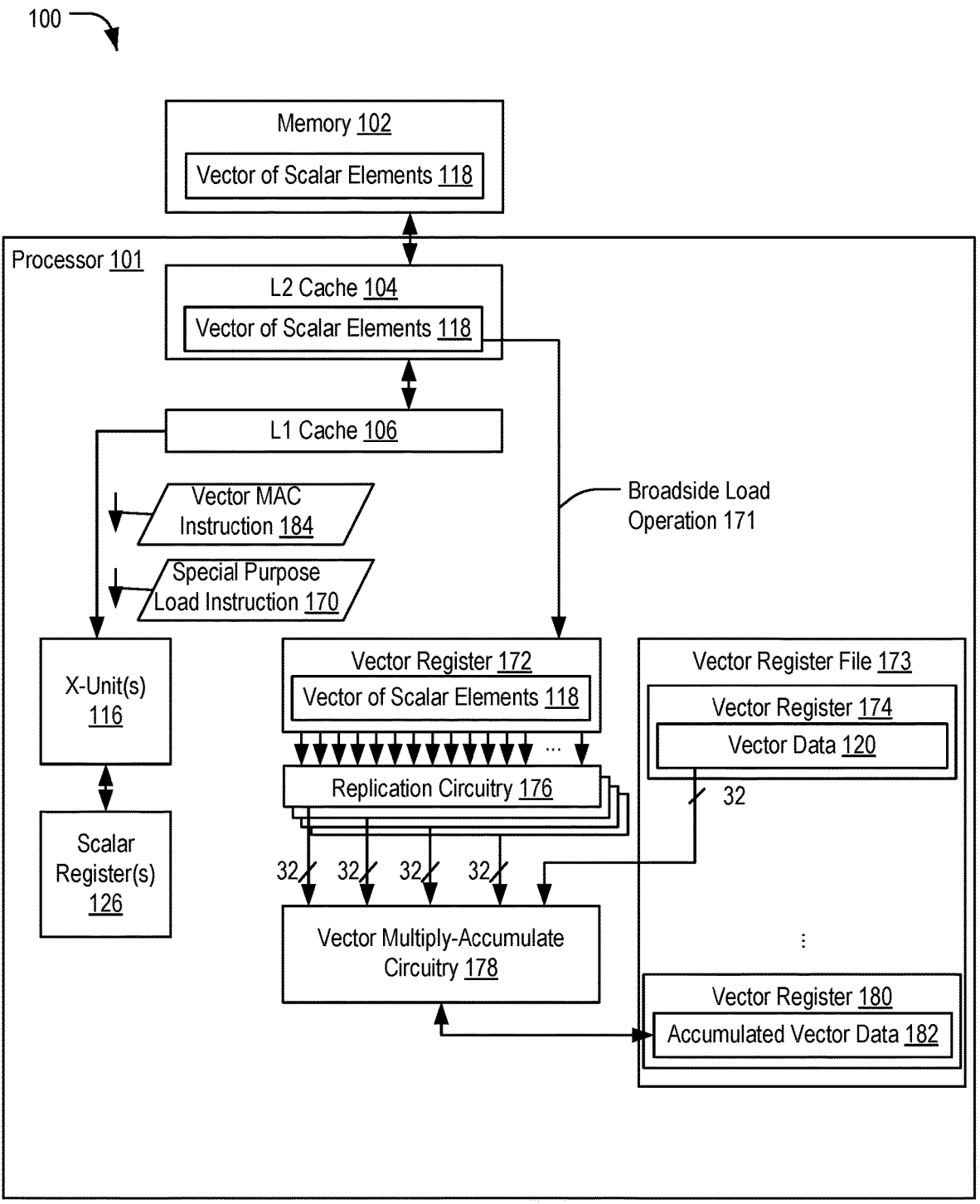
FIG. 1 is a block diagram of a particular implementation of a processor that includes a vector register.

FIG. 1 depicts a processor system 100 including a vector register 172 configured to load data responsive to a special purpose load instruction 170 and circuitry configured to enable replication of a selected sub-vector value from the vector register 172, as described further below. For example, the vector register 172 may include data corresponding to multiple pixels, such as a 128-byte vector that includes four-byte values for each of 32 pixels. Each of the four-byte values forms a sub-vector value that may be selected for replication (e.g., generation of multiple copies). Each copy of the selected sub-vector value may be used in a vector operation, as described in further detail below.

The processor system 100 includes a memory 102 coupled to a processor 101. The processor 101 includes a processor memory system including an L2 cache 104 and an L1 cache 106. Scalar components include one or more execution units, such as a representative execution unit 116, and one or more scalar registers, such as a representative scalar register 126, of a general register file. Vector components include the vector register 172 coupled to replication circuitry 176, a vector register file 173, and vector multiply-accumulate (MAC) circuitry 178. The vector register 172 is outside of (e.g., external to) the vector register file 173. The vector register file 173 includes multiple vector registers, illustrated as representative second vector register 174 and third vector register 180, that are accessible via one or more ports of the vector register file 173. Although two vector registers are illustrated in the vector register file 173, in other implementations the vector register file 173 includes more than two vector registers.

The execution unit 116 is configured to execute the special purpose load instruction 170 to initiate a "broadside" load operation 171 that loads a vector of scalar elements 118 from the L2 cache 104 to the vector register 172, such as via a bus or set of signal lines that couples the L2 cache 104 to the vector register 172. The special purpose load instruction 170 causes loading of multiple scalar values of the vector 118 (e.g., 32 four-byte words) in parallel into the vector register 172. Although a 128-byte vector, formed of 32 four-byte words, is used herein for illustration, in other implementations other vector sizes and word sizes can be used. In contrast to the broadside load operation 171 to load the vector register 172 with data from the L2 cache 104, a conventional load operation to load data into the scalar register 126 would transfer the data from the L2 cache 104 to the L1 cache 106 and then load a single 32-bit word from the L1 cache 106 to the scalar register 126. The broadside load operation 171 therefore loads a larger amount of data than a conventional load operation to the scalar register 126 and transfers the data to the vector register 172 without using the L1 cache as an intermediate stage.

The vector register 172 is configured to enable replication of a selected sub-vector value of the vector of scalar elements 118. In an example, each sub-vector unit (e.g., a four-byte word) of the vector of scalar elements 118 in the vector register 172 is coupled to the replication circuitry 176 and is individually selectable as an input value to the replication circuitry 176 (e.g., coupled to a selectable input of a multiplexor in the replication circuitry 176). When selected by the replication circuitry 176, the selected four-byte sub-vector unit is replicated (e.g., multiple copies of the four-byte sub-vector values are generated at substantially the same time) and provided at each of 32 outputs of the replication circuitry 176. In a particular implementation, the replication circuitry 176 includes a multiplexor configured to select any one of the sub-vector values stored in the vector register 172. The multiplexor has a fan-out of 32 and is configured to select a single four-byte input value from the 32 available four-byte sub-vector values in the vector register 172 and to output 32 copies of the selected four-byte sub-vector value. The 32 copies of the selected four-byte sub-vector value are provided to inputs of the vector multiply-accumulate circuitry 178. In some implementations, the replication circuitry 176 is dedicated for use with (e.g., implemented as part of) the vector register 172, in contrast to the vector registers in the vector register file 173 (e.g., the vector register 174 and the vector register 180) which do not have the ability to replicate or "splat" selected data.

The vector multiply-accumulate (MAC) circuitry 178 includes vector operation circuitry configured to perform a vector operation that uses the replicated sub-vector values that are received from the replication circuitry 176 and that uses sub-vector values in the second vector register 174. The vector multiply-accumulate circuitry 178 is configurable to store results of the vector operation into the third vector register 180. As illustrated, the replicated outputs from the replication circuitry 176 are provided to inputs of the vector multiply-accumulate circuitry 178. Vector data 120 from the second vector register 174 is also provided to the inputs of the vector multiply-accumulate circuitry 178. A byte-wise multiplication of each four-byte word from the replication circuitry 176 with the corresponding four-byte word from the second vector register 174 is performed at the vector multiply-accumulate circuitry 178. The results of each byte-wise multiply are added together to generate a result for each four-byte word, and the results for each four-byte word are accumulated with accumulated vector data 182 in the third vector register 180. As used herein, a first value is "accumulated with" a second value when the first value is combined with the second value, such as by adding the first value to the second value. In some implementations, the second value is "accumulated data" that represents a running total of multiple values that are to be accumulated with the second value, such as to represent an output pixel that is determined during a filtering operation and that has a value computed as a weighted sum of multiple input pixel values.

Multiple instances of the replication circuitry 176 are coupled to the vector register 172 to enable selection of multiple sub-vector values from the vector register 172 and replication of the selected sub-vector values for input to a vector operation. For example, the processor 101 includes four instances of the replication circuitry 176. Each instance of the replication circuitry 176 is configured to select a different four-byte word from the vector register 172, to replicate the selected four-byte word, and to provide the replicated four-byte word to the vector multiply-accumulate circuitry 178. Thus, four vector multiply-accumulate operations may be performed in parallel on the vector data 120 using four selected four-byte words from the vector register 172 responsive to a single vector instruction 184, such as a vector multiply-accumulate (MAC) instruction. The vector instruction 184 is a special-purpose instruction that causes the processor 101 to select one or more sub-vector values from the vector register 172, replicate the one or more sub-vector values to inputs of the vector multiply-accumulate circuitry 178, and perform a vector operation at the vector multiply-accumulate circuitry 178 using the replicated one or more sub-vector values.

To illustrate, the vector MAC instruction 184 may include a parameter that indicates an offset into the vector register 172, and each instance of the replication circuitry 176 may select a respective four-byte word for replication based on the parameter. For example, the parameter may specify a value indicating one of the first 8 four-byte words in the vector register 172. The parameter may be used to generate a selection signal at a control input of a multiplexor of a first instance of the replication circuitry 176 to cause the multiplexor to select the indicated four-byte word. The replication circuitry 176 may include offset generation circuitry that is configured to add offsets to the parameter to generate a second value that indicates one of the four-byte words of a next group of 8 four-byte words in the vector register 172, a third value that indicates one of the four-byte words of a third group of 8 four-byte words in the vector register 172, and a fourth value that indicates one of the four-byte words of a fourth group of 8 four-byte words in the vector register 172. The second value may be used to generate a second selection signal at a control input of a second multiplexor of a second instance of the replication circuitry 176 to cause the second multiplexor to select the second indicated four-byte word. The third value may be used to generate a third selection signal at a control input of a third multiplexor of a third instance of the replication circuitry 176 to cause the third multiplexor to select the third indicated four-byte word. The fourth value may be used to generate a fourth selection signal at a control input of a fourth multiplexor of a fourth instance of the replication circuitry 176 to cause the fourth multiplexor to select the fourth indicated four-byte word. In an illustrative example in which the parameter indicates a starting byte of the selected four-byte word in the first group of 8 four-byte words, the offset generation circuitry applies multiples of 32 bytes to the value of the parameter to select the remaining four-byte words for replication (e.g., to select words starting at byte 8, byte 40, byte 72, and byte 104).

Alternatively, the vector instruction 184 may enable access to the vector register 172 via indirection. To illustrate, the vector instruction 184 may include a parameter identifying a register (e.g., the scalar register 126), and the value stored in the identified register may be used as an offset into the vector register 172. For example, the parameter may identify a scalar register that stores a scalar value that indicates the selected sub-vector value. Additional offsets may be calculated by adding multiples of 32 bytes, as described above, to the value stored in the identified register. Thus, the processor 101 includes circuitry configured to access a scalar value (e.g., the offset) from the scalar register 126, where the scalar value indicates the selected sub-vector element in the vector register 172.

During operation, the processor 101 executes instructions to perform a vector operation, such as applying a filter operation to a set of pixel data. To illustrate, the set of pixel data may represent pixels of an image captured by a camera and loaded into the memory 102, and the filter operation may include processing the pixel data using an edge detection filter to identify edges in the pixel data. In another illustrative example, the pixel data corresponds to elements in a convolutional layer of a neural network and does not necessarily represent image data. Data representing a filter may be loaded, via a vector load operation, from the L2 cache 104 into the vector register 174 in the vector register file 173 as the vector data 120. The processor 101 executes the special purpose load instruction 170 to load data to be filtered into the vector register 172. For example, a portion (e.g., a first portion) of the pixel data is loaded from the L2 cache 104 to the vector register 172 via the broadside load operation 171.

After loading the first portion of the pixel data into the vector register 172, the processor 101 executes the vector multiply-accumulate instruction 184 to multiply one or more replicated portions of the vector 118 with portions of the vector data 120. For example, a first instance of the replication circuitry 176 selects and replicates a first four-byte word of the vector 118 and outputs a copy of the first four-byte word into each of 32 inputs to the vector multiply-accumulate circuitry 178. The vector register 174 also provides 32 four-byte values from the vector data 120 (e.g., 32 filter weights) to inputs of the vector multiply-accumulate circuitry 178. The vector multiply-accumulate circuitry 178 multiplies, in parallel, each copy of the first four-byte word from the vector 118 with a respective four-byte word from the vector data 120 to generate 32 multiplication results. Each of the 32 multiplication results is accumulated with corresponding values in the vector register 180 to generate 32 updated values in the accumulated vector data 182.

In parallel with the first instance of the replication circuitry 176 selecting and replicating the first four-byte word of the vector 118, a second instance of the replication circuitry 176 selects and replicates a second four-byte word of the vector 118, a third instance of the replication circuitry 176 selects and replicates a third four-byte word of the vector 118, and a fourth instance of the replication circuitry 176 selects and replicates a fourth four-byte word of the vector 118. As used herein, two or more operations that are performed "in parallel" are performed at substantially the same time, such as during the same clock cycle or at least partially overlapping in time with each other, but are not necessarily initiated (or concluded) at exactly the same time as each other. The vector multiply-accumulate circuitry 178 generates a second, third, and fourth set of 32 four-byte values by multiplying the 32 four-byte values from the vector data 120 with the second four-byte word of the vector 118, the third four-byte word of the vector 118, and the fourth four-byte word of the vector 118, respectively. The second, third, and fourth set of 32 four-byte values are accumulated with corresponding values in the accumulated vector data 182.

The vector multiply-accumulate instruction 184 may be included in a loop that updates the location of the four-byte words that are selected from the vector register 172 during each loop iteration. When all values in the vector register 172 have been processed, a next broadside load operation 171 may be performed to load a next batch of pixel data into the vector register 172 to continue processing, such as described in further detail with reference to FIG. 2. The resulting values in the accumulated vector data 182 may correspond to the result of applying (e.g., convolving) the filter represented by the pixel weights in the vector register 174 to the pixel data. Although the above example describes a use case in which the vector register 172, the replication circuitry 176, and the vector multiply-accumulate circuitry 178 operate to filter pixel data, in other implementations the vector register 172, the replication circuitry 176, and the vector multiply-accumulate circuitry 178 operate in accordance with other use cases, such as to perform matrix multiplication, as a non-limiting example.

The vector register 172 coupled to the replication circuitry 176 enables selection and replication of sub-vector values for input into the vector multiply-accumulate circuitry 178 and circumvents delays that would be incurred if the sub-vector values were instead loaded into the scalar register 126 and replicated from the scalar register 126 to the vector multiply-accumulate circuitry 178 (e.g., avoiding delays due to transferring data into the L1 cache and from the L1 cache into the general register file). Further, the broadside load operation 171 enables a relatively large amount of data to be transferred from the L2 cache 104 to the vector register 172, reducing an average number of load instructions that are executed by the processor 101 for each unit of data that is to be loaded from the L2 cache 104. In addition, because implementing the vector register file 173 with additional ports is relatively expensive and area-intensive, the vector register file 173 may be port-limited. Loading the vector of scalar elements 118 into a vector register within the vector register file 173 in implementations in which the vector register file 173 is port-limited may incur delay and resource conflicts associated with transferring data into the vector register file 173 when all available ports of the vector register file 173 are in use for other operations. As a result, loading the vector of scalar elements 118 into the vector register 172 that is outside of the vector register file 173 and that is not loaded via the ports of the vector register file 173 reduces delays and resource conflicts as compared to loading the vector of scalar elements 118 into a vector register within the vector register file 173 in implementations in which the vector register file 173 is port-limited.

Although FIG. 1 depicts a particular illustrative implementation of the vector register 172 in the processor 101 for purpose of explanation, it should be understood that in other implementations the vector register 172 may be used in conjunction with other configurations. For example, although the replication circuitry 176 is illustrated as coupled to the vector register 172, in other implementations the replication circuitry 176 is incorporated within the vector register 172. Although four instances of the replication circuitry 176 are illustrated to select and replicate four values from the vector register 172 in parallel, in other implementations one, two, three, or more than four instances of the replication circuitry 176 are configured to select and replicate values from the vector register 172. Further, the vector register 172 may be implemented having any size and is not limited to the specific examples provided here. In particular, the size of the vector register 172 may be orthogonal to the amount of replication, and in different implementations different sizes of data are loaded into the vector register 172 and different numbers of values are replicated from the vector register 172.

Although the replication circuitry 176 is illustrated as providing replicated outputs to inputs of the vector multiply-accumulate circuitry 178, in other implementations, the replication circuitry 176 provides replicated outputs to another vector processing circuit, such as a vector adding circuit, a vector multiplier circuit, a vector shifter circuit, any other vector processing circuit, or any combination thereof. Similarly, although the vector instruction 184 is described as a vector multiply-accumulate instruction 184, in other implementations the vector instruction 184 corresponds to another type of vector instruction, such as a vector add instruction, a vector multiply instruction, a vector shift instruction, any other vector instruction, or any combination thereof.

Although the processor 101 is illustrated in conjunction with a memory system that includes the L1 cache 106, the L2 cache 104, and the memory 102, in other implementations the processor 101 is used in conjunction with a memory system that omits one or more of the L1 cache 106, the L2 cache 104, or the memory 102, that adds one or more additional memory device (e.g., an L3 memory), or any combination thereof. Although the processor 101 is illustrated as including a single execution unit 116, in other implementations the processor includes multiple execution units and is configured to operate according to a very long instruction word (VLIW) configuration, a superscalar configuration, one or more other configurations, or any combination thereof.

Figure 2:
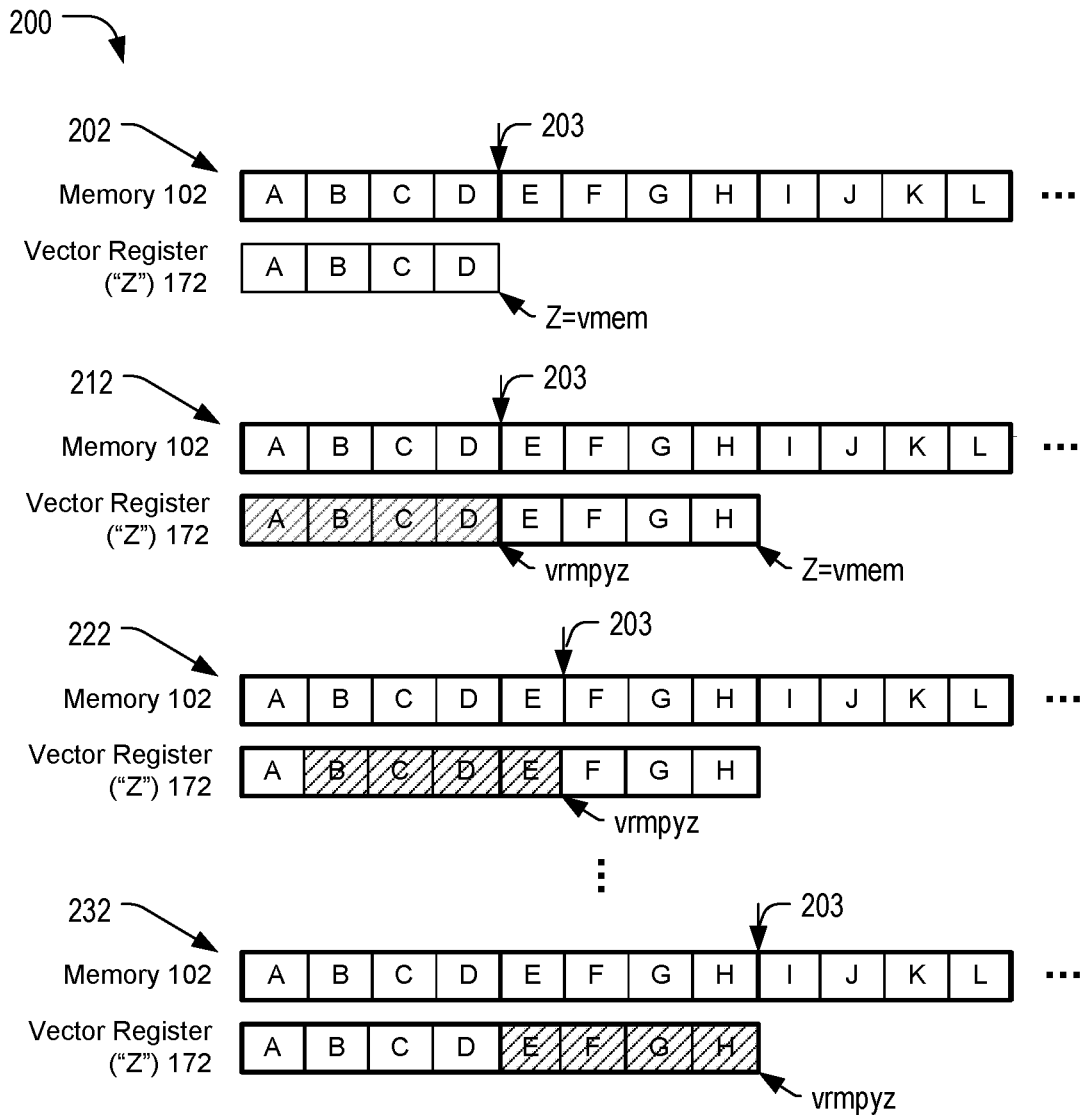
FIG. 2 is a diagram of a particular implementation of an operation that uses the vector register of FIG. 1.

FIG. 2 depicts a particular implementation of an operation 200 that uses the vector register 172 of FIG. 1. Three vectors of data are illustrated as stored in consecutive locations in the memory 102, including a first vector having elements A, B, C, and D, a second vector having elements E, F, G, and H, and a third vector having elements I, J, K, and L. Each of the elements A-L corresponds to a multiple-byte value, such as a 32-byte value. In an illustrative example, each of the elements A-L corresponds to a value (e.g., a pixel) of a convolutional layer of a neural network, such as in a "slices-of-bread" data arrangement associated with the convolutional layer. For example, a neural network configured to perform a machine vision application on input image data may include one or more convolutional layers having a slices-of-bread data arrangement.

A first stage 202 illustrates loading of the first vector (having elements A, B, C, and D) via executing a vector memory "vmem" instruction (the special purpose load instruction 170) to broadside load the first vector into the vector register ("Z buffer") 172. A pointer 203 indicates a position of a convolutional filter operation to be performed. The first vector loaded into the vector register 172 corresponds to a "window" into the memory 102. Once loaded into the vector register 172, sub-vector values of the first vector are selected, replicated, and used in a convolutional filter operation, as described below.

A second stage 212 illustrates processing of the elements A, B, C, and D via execution of an instruction, such as the vector instruction 184 of FIG. 1. As illustrated, the instruction corresponds to a vector reduce-multiply Z-buffer instruction ("vrmpyz") that is executed to operate on the first vector. A loop parameter of the convolutional filter operation (e.g., stored in the scalar register 126) indicates a position of a selected sub-vector value in the vector register 172, such as starting at a first 4-byte word of element "D" and progressing, with each loop iteration, to the next 4-byte word of element "D". In parallel, multiples of 32-byte offsets are applied to the position of the selected sub-vector to determine positions of a second sub-vector value, a third sub-vector value, and a fourth sub-vector value.

To illustrate, in a first loop iteration, the first four-byte value of A, the first four-byte value of B, the first four-byte value of C, and the first four-byte value of D are selected at the vector register 172, replicated, and provided to inputs to the vector multiply-accumulate circuitry 178 of FIG. 1. In the second loop iteration, the second four-byte value of A, the second four-byte value of B, the second four-byte value of C, and the second four-byte value of D are selected, replicated, and provided to the inputs to the vector multiply-accumulate circuitry 178 of FIG. 1. At each loop iteration the vector multiply-accumulate circuitry 178 multiplies the replicated selected values from the vector register 172 with values (e.g., the vector data 120) representing weights of the convolutional filter that are retrieved from the vector register 174 or that have been loaded into memory. Results of the multiplications are accumulated in the vector register 180.

Also in the second stage 212, a next portion of the vector register 172 is loaded with a next "window" of the memory 102 via execution of the special purpose load instruction 170 to broadside load elements E, F, G, and H into the vector register 172.

In a third stage 222, the pointer 203 is advanced by one element (i.e., stride=1) and the elements B, C, D, and E are processed via execution of the vector reduce-multiply Z-buffer instruction ("vrmpyz") in a similar manner as described with respect to elements A, B, C, and D in the second stage 212.

Processing continues with each subsequent stage having the pointer 203 advancing by one element and execution of the vector reduce-multiply Z-buffer instruction ("vrmpyz") on the corresponding shifted set of four elements.

At a sixth stage 232, the convolutional filter operation has advanced to element I, and a next "window" of the memory 102 is to be copied to the vector register 172 prior to commencing a next stage that operates on element I. In some implementations, the elements I, J, K, and L overwrite the elements A, B, C, and D in the vector register 172, and the vector register 172 is operated as a circular buffer.

By using broadside load operations to load the vector register 172 with consecutive "windows" of the memory 102 and splatting selected values from each element of the vector register 172 to be multiplied by a corresponding set of convolutional filter weights, convolutional filter processing may be performed at higher speed and with a reduced number of data transfers through the general register file. As a result, operations such as neural network-based image recognition may be performed more efficiently as compared to processors that do not include the vector register 172.

Although the convolutional filter operation is described as multiplying each selected sub-vector value from the vector register 172 by a common set of weights, in other implementations multiple sets of weights can be used. As an illustrative example, the second stage 212 may include sub-vector values from A multiplied by a first set of weights and, in parallel, sub-vector values from B are multiplied by a second set of weights, sub-vector values from C are multiplied by a third set of weights, and sub-vector values from D are multiplied by a fourth set of weights. Although the example of FIG. 2 illustrates the pointer 203 advances one element per stage (stride=1), in other implementations the pointer 203 advances two elements per stage, three elements per stage, or more (i.e., the stride has any positive integer value). While FIG. 2 depicts an implementation with enhanced efficiency for applying a convolutional filter associated with a convolutional layer of a neural network, in other implementations the vector register 172 is used to provide enhanced efficiency for other applications, such as matrix multiplication.

Figure 3:
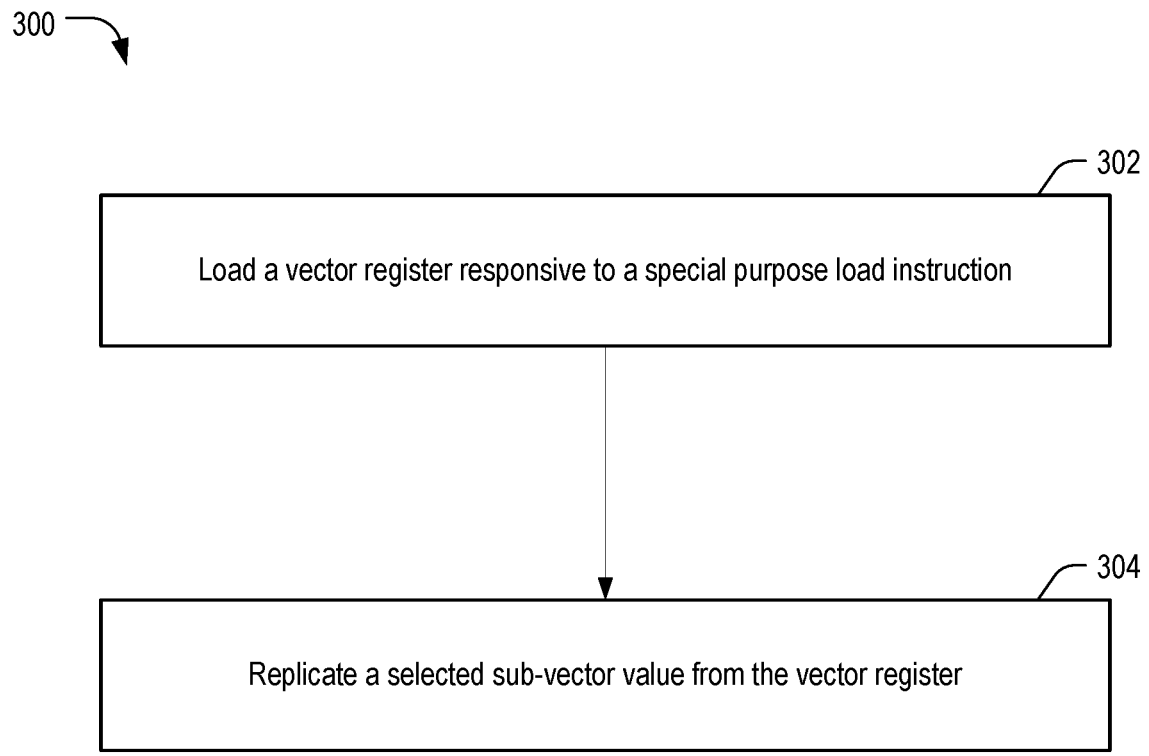
FIG. 3 is a flow chart of a particular implementation of a method of operation that may be performed by the processor of FIG. 1.

FIG. 3 depicts an example of a method 300 of operating a processor, such as the processor 101 of FIG. 1. The method 300 includes loading a vector register responsive to a special purpose load instruction, at 302. In an illustrative example, loading the vector register includes loading multiple scalar values, in parallel, into the vector register. For example, the processor 101 of FIG. 1 executes the special purpose load instruction 170 to perform the broadside load operation 171 to load the vector of scalar elements 118 into the vector register 172.

The method 300 includes replicating a selected sub-vector value from the vector register, at 304. For example, the processor 101 executes the vector multiply-accumulate instruction 184 to cause the replication circuitry 176 to replicate a selected sub-vector value from the vector register 172 and to cause the vector multiply-accumulate circuitry 178 to operate using the replicated sub-vector values as inputs. In some implementations, the selected sub-vector value is identified via a parameter of an instruction, such as byte offset parameter that is provided in conjunction with the vector multiply-accumulate instruction 184 and that indicates a position in the vector register of the selected sub-vector value. In other implementations, the method 300 includes accessing, from a scalar register, a scalar value that indicates the selected sub-vector value. For example, the scalar register 126 may store a value of a loop variable that indicates a position in the vector register 172 (e.g., a byte offset value), and the vector multiply-accumulate instruction 184 may include a parameter that identifies the scalar register 126 as storing the position of the selected sub-vector value.

In some implementations, the method 300 includes performing a vector operation using the replicated sub-vector values and using sub-vector values in a second vector register. To illustrate, the vector multiply-accumulate instruction 184 is executed to cause the vector multiply-accumulate circuitry 178 to perform a vector multiply of values in the vector register 174 and the replicated sub-vector value from the replication circuitry 176. Results of the vector operation are stored into a third vector register, such as the vector register 180.

In some implementations, the method 300 includes replicating a second sub-vector value from the vector register in parallel with replicating the selected sub-vector value. In an illustrative example, the replication circuitry 176 selects 4 four-byte values from the vector register 172 and outputs 32 instances of each of the four-byte values. In some implementations the second sub-vector value is selected explicitly, such as via an instruction parameter. In other implementations, the second sub-vector value is selected implicitly, such as by the replication circuitry applying an offset (e.g., a 32-byte offset) to a position in the vector register of the selected sub-vector value to select a position in the vector register of the second sub-vector value. As an illustrative example, the position of the selected sub-vector value corresponds to a loop parameter of a convolutional filter operation, such as described with reference to FIG. 2, and the offset corresponds to a 32-byte offset.

In some implementations, the method 300 also includes performing a second vector operation using the second replicated sub-vector value in parallel with performing the vector operation. As in illustrative example, the vector multiply-accumulate circuitry 178 performs a first set of multiply-accumulate operations using values of the vector register 174 and the replicated first 4-byte word from the vector register 172 while also performing a second set of multiply-accumulate operations using the values of the vector register 174 and the replicated second 4-byte word from the vector register 172.

By loading a vector register responsive to a special purpose load instruction and replicating a selected sub-vector value from the vector register, the method 300 enables loading of values into the vector register that bypasses loading of the values via a scalar register file. For example, the vector 118 is loaded from the L2 cache 104 to the vector register 172 for replication and is not transferred to the L1 cache and to the scalar register 126 for replication. Thus, a potential performance bottleneck associated with loading data to a scalar register file is avoided. In addition, multiple values may be loaded into the vector register in response to the special purpose load instruction, such as 32 four-byte values that are loaded during a single instance of the broadside load operation 171 of FIG. 1. Loading multiple values in response to a single load instruction reduces a number of load operations to be performed as compared to processors that load a single value per load instruction. Processor performance is therefore improved as a result of avoiding processor bottlenecks, reducing a number of load instructions that are executed, or a combination thereof.

Figure 4:
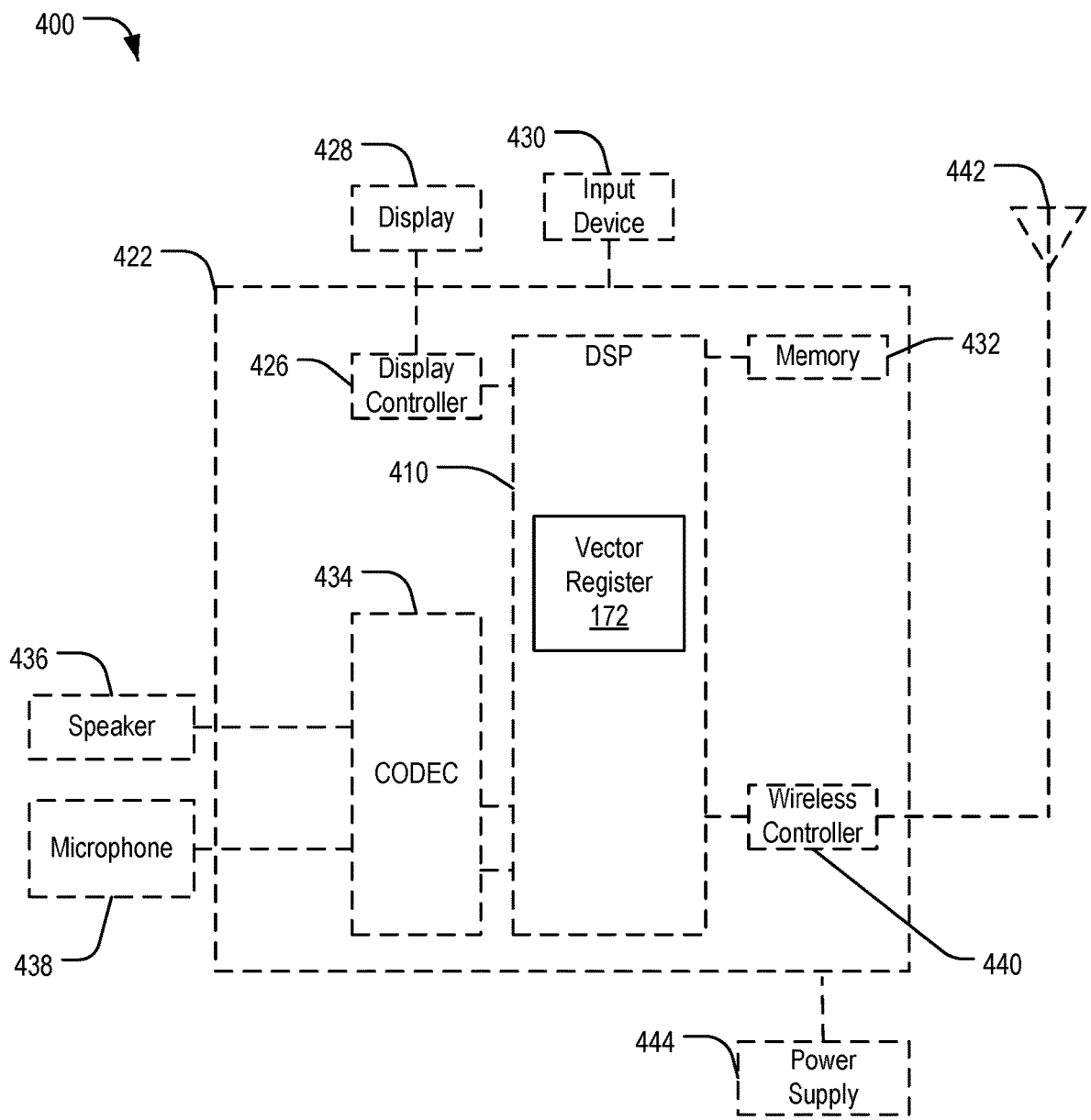
FIG. 4 is a block diagram of a portable device that includes a processor having the vector register of FIG. 1.

Referring to FIG. 4, a block diagram of a particular illustrative implementation of an electronic device that includes a processor 410 that includes the vector buffer 172 of FIG. 1 is depicted and generally designated 400. The electronic device 400 may correspond to a mobile device (e.g., a cellular telephone), as an illustrative example. In other implementations, the electronic device 400 may correspond to a computer (e.g., a server, a laptop computer, a tablet computer, or a desktop computer), a wearable electronic device (e.g., a personal camera, a head-mounted display, or a watch), a vehicle control system or console, a home appliance, a set top box, an entertainment unit, a navigation device, a television, a monitor, a tuner, a radio (e.g., a satellite radio), a music player (e.g., a digital music player or a portable music player), a video player (e.g., a digital video player, such as a digital video disc (DVD) player or a portable digital video player), a robot, a healthcare device, another electronic device, or a combination thereof.

The device 400 includes the processor 410, such as a digital signal processor (DSP), coupled to a memory 432. The processor 410 includes the vector buffer 172 and is configured to execute the special purpose load instruction 170 of FIG. 1 to perform a broadside load into the vector register 172. The processor 410 is also configured to execute the vector multiply-accumulate instruction 184 of FIG. 1 that includes replicating one or more sub-vector values in the vector register 172. In some implementations, the processor 410 corresponds to the processor 101 of FIG. 1.

The memory 432 may be coupled to or integrated within the processor 410. The memory 432 may include random access memory (RAM), magnetoresistive random access memory (MRAM), flash memory, read-only memory (ROM), programmable read-only memory (PROM), erasable programmable read-only memory (EPROM), electrically erasable programmable read-only memory (EEPROM), one or more registers, a hard disk, a removable disk, a compact disc read-only memory (CD-ROM), another storage device, or a combination thereof. The memory 432 stores one or more instructions that are executable by the processor 410 to perform operations, such as the special purpose load instruction 170 and the vector multiply-accumulate instruction 184.

FIG. 4 also shows a display controller 426 that is coupled to the digital signal processor 410 and to a display 428. A coder/decoder (CODEC) 434 can also be coupled to the digital signal processor 410. A speaker 436 and a microphone 438 can be coupled to the CODEC 434.

FIG. 4 also indicates that a wireless controller 440 can be coupled to the processor 410 and to an antenna 442. In a particular implementation, the processor 410, the display controller 426, the memory 432, the CODEC 434, and the wireless controller 440 are included in a system-in-package or system-on-chip device 422. In a particular implementation, an input device 430 and a power supply 444 are coupled to the system-on-chip device 422. Moreover, in a particular implementation, as illustrated in FIG. 4, the display 428, the input device 430, the speaker 436, the microphone 438, the antenna 442, and the power supply 444 are external to the system-on-chip device 422. However, each of the display 428, the input device 430, the speaker 436, the microphone 438, the antenna 442, and the power supply 444 can be coupled to a component of the system-on-chip device 422, such as an interface or a controller.

The foregoing disclosed devices and functionalities, e.g., as described in reference to any one or more of FIGS. 1-4, may be designed and configured into computer files (e.g., RTL, GDSII, GERBER, etc.) stored on computer readable media. Some or all such files may be provided to fabrication handlers who fabricate devices based on such files. Resulting products include semiconductor wafers that are then cut into semiconductor die and packaged into a semiconductor chip. The chips are then employed in devices described above.

In connection with the disclosed examples, a non-transitory computer-readable medium (e.g., the memory 102 or the memory 432) stores instructions that are executable by a processor (e.g., the special purpose load instruction 170 and the vector multiply-accumulate instruction 184) to cause the processor to load a vector register, such as the vector register 172) responsive to a special purpose load instruction, and to replicate a selected sub-vector value from the vector register. For example, in a particular aspect the memory 102 stores instructions to cause the processor 101 to perform the method 300 of FIG. 3.

In conjunction with the disclosed examples, an apparatus includes means for storing data loaded responsive to a special purpose load instruction. For example, the means for storing data may correspond to the vector register 172 of FIG. 1 or FIG. 4, one or more other circuits or devices to store data responsive to a special purpose load instruction, or any combination thereof.

The apparatus also includes means for replicating a selected sub-vector value from the means for storing data. For example, the means for replicating may correspond to the replication circuitry 176 of FIG. 1, one or more other circuits or devices to replicate a selected sub-vector value, or any combination thereof.

In some implementations, the apparatus also includes second means for storing data (e.g., the vector register 174 of FIG. 1), third means for storing data (e.g., the vector register 180 of FIG. 1), and means for performing a vector operation (e.g., the vector multiply-accumulate circuitry 178 of FIG. 1) using the replicated sub-vector value and using sub-vector values in the second means for storing data and for storing results of the vector operation into the third means for storing data.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Portions of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g. tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A processor comprising:
    a vector register configured to load data from a cache memory responsive to a special purpose load instruction; and
    replication circuitry configured to, responsive to a vector instruction, independently of any vector register included within vector operation circuitry, and while retaining the data in the vector register, replicate a selected sub-vector value from the vector register and input multiple copies of the selected sub-vector value to the vector operation circuitry.

2. The processor of claim 1, wherein the replication circuitry includes a multiplexor having an input coupled to the vector register and an output coupled to the vector operation circuitry, the multiplexor configured to select any sub-vector value from the vector register and to input the multiple copies of the selected sub-vector value to the vector operation circuitry independently of any vector register included within the vector operation circuitry.

3. The processor of claim 1, wherein:
    the cache memory comprises a higher-level cache and a separate lower-level cache; and
    the special purpose load instruction is configured to cause loading of multiple scalar values in parallel from the higher-level cache into the vector register without transferring the multiple scalar values through the lower-level cache.

4. The processor of claim 1, further comprising a second vector register, wherein the vector instruction corresponds to a vector multiply-accumulate instruction, and wherein the vector operation circuitry is configured to perform, responsive to the vector instruction, a vector multiply-accumulate operation using replicated sub-vector values and using sub-vector values in the second vector register.

5. The processor of claim 4, further comprising a vector register file that includes the second vector register, and wherein the vector register is outside of the vector register file.

6. The processor of claim 4, wherein the replication circuitry is further configured to replicate a second sub-vector value from the vector register in parallel with replicating the selected sub-vector value.

7. The processor of claim 6, wherein the vector operation circuitry is configured to perform a second vector operation in parallel with performing the vector multiply-accumulate operation, the second vector operation using the second replicated sub-vector value.

8. The processor of claim 6, wherein the replication circuitry is configured to apply an offset to a position in the vector register of the selected sub-vector value to select a position in the vector register of the second sub-vector value.

9. The processor of claim 8, wherein the position of the selected sub-vector value is indicated by a loop parameter of a convolutional filter operation.

10. A method of operating a processor, the method comprising:
    loading data from a cache memory into a vector register responsive to a special purpose load instruction; and
    responsive to a vector instruction, independently of any vector register included within vector operation circuitry, and without altering the data in the vector register:
        replicating a selected sub-vector value from the vector register; and
        providing the replicated sub-vector values to the vector operation circuitry.

11. The method of claim 10, further comprising accessing a scalar value from a scalar register, the scalar value indicating the selected sub-vector value.

12. The method of claim 10, wherein:
    the cache memory comprises a higher-level cache and a separate lower-level cache; and
    the loading of the data into the vector register comprises loading multiple scalar values, in parallel, from the higher-level cache into the vector register without transferring the multiple scalar values through the lower-level cache.

13. The method of claim 10, further comprising, responsive to the vector instruction:
    performing a vector operation using the replicated sub-vector values and sub-vector values in a second vector register; and
    storing results of the vector operation into a third vector register.

14. The method of claim 13, further comprising replicating a second sub-vector value from the vector register in parallel with replicating the selected sub-vector value.

15. The method of claim 14, further comprising performing a second vector operation in parallel with performing the vector operation, the second vector operation using the second replicated sub-vector value.

16. The method of claim 14, further comprising applying an offset to a position in the vector register of the selected sub-vector value to select a position in the vector register of the second sub-vector value.

17. The method of claim 16, wherein the position of the selected sub-vector value corresponds to a loop parameter of a convolutional filter operation.

18. An apparatus comprising:
    means for performing a vector operation;
    means for caching data, wherein the means for caching data comprises a higher-level means for caching data and a separate lower-level means for caching data;
    means for storing data loaded from the means for caching data responsive to a special purpose load instruction, wherein the special purpose load instruction is configured to cause loading of multiple scalar values in parallel from the higher-level means for caching data into the means for storing data without transferring the multiple scalar values through the lower-level means for caching data; and
    means for replicating a selected sub-vector value from the means for storing data and inputting multiple copies of the selected sub-vector value to the means for performing a vector operation responsive to a vector instruction, independently of any vector register included within the means for performing a vector operation, and while maintaining the data in the means for storing data.

19. The apparatus of claim 18, further comprising second means for storing data, and wherein the means for performing a vector operation is configured to use the replicated sub-vector values and sub-vector values in the second means for storing data.

20. The apparatus of claim 18, wherein the means for replicating and inputting is further configured to replicate a second sub-vector value from the means for storing data in parallel with replicating the selected sub-vector value.

21. A non-transitory computer-readable medium comprising instructions that, when executed by a processor, cause the processor to perform operations comprising:

loading data from a cache memory comprising a higher-level cache and a separate lower-level cache into a vector register responsive to a special purpose load instruction configured to cause loading of multiple scalar values in parallel from the higher-level cache into the vector register without transferring the multiple scalar values through the lower-level cache; and responsive to a vector instruction, independently of any vector register included within vector operation circuitry, and while maintaining the data in the vector register, replicating a selected sub-vector value from the vector register and inputting multiple copies of the selected sub-vector value to the vector operation circuitry.

22. The non-transitory computer-readable medium of claim 21, wherein the operations further comprise:

performing a vector operation using the replicated sub-vector values and using sub-vector values in a second vector register; and storing results of the vector operation into a third vector register.

23. The non-transitory computer-readable medium of claim 21, wherein a position of the selected sub-vector value in the vector register is indicated by a loop parameter of a convolutional filter operation.

* * * * *